Patented June 25, 1940

2,205,654

UNITED STATES PATENT OFFICE 2,205,654

DIELECTRIC COMPOSITION

Roy W. Ide, Jr., Gary, Ind., and Herbert A. Winkelmann, Chicago, Ill., assignors to Marbon Corporation, Chicago, Ill., a corporation of Delaware No Drawing. Application April 29, 1937, Serial No. 139,736

3 Claims. (Cl. 260—4)

This invention relates to a composition of matter particularly suitable for use as a dielectric.

Polymerized vinyl chloride is acid, alkali, water and flameproof. It has high dielectric strength, and is resistant to ozone. However, it is not very plastic by itself. For example, when an attempt is made to sheet it on ordinary rubber compounding rolls, it behaves similar to dry gelatine.

Hitherto various ingredients have been added to polyvinyl chloride in order to soften it and improve its milling characteristics. Liquid plasticizers have been added. These, however, cause loss in strength without giving entirely satisfactory compositions for milling. The addition of polyvinyl acetate improves the toughness and flexibility of the composition, and also gives a composition which may be readily milled and calendered. However, the water resistance of the composition is decreased, and the composition has other disadvantages.

We have discovered that the addition of rubber hydrochloride to polyvinyl chloride gives a product which is tough, capable of being milled and calendered, and also highly resistant to water. Moreover, the composition is more resistant to ozone, and petroleum oils than the polyvinyl chloride by itself. Thin films made from the composition are clear and show no tendency for the ingredients to separate or bloom.

We have discovered that the vinyl chloride-rubber hydrochlorides are particularly valuable for many electrical purposes. Plates and tubes of polyvinyl chloride-rubber hydrochloride may suitably be used as a dielectric for ozonators. Thin sheets give good service as a dielectric in ordinary condensers. Likewise, the composition may be dissolved in solvents and coated either on bare wire conductors, or over other insulation on wire; or it may be tubed on the wire in a manner similar to the production of tubed rubber insulation. Plasticizers such as dibutyl phthalate, soft chlorinated diphenyls, and the like may be incorporated with the rubber hydrochloride-polyvinyl chloride mixtures to increase the flexibility. Likewise, stabilizers such as basic alkali metal compounds, basic alkali earth metal compounds, and basic lead compounds may be incorporated to increase heat stability and ozone resistance both of the rubber hydrochloride and the vinyl chloride.

The rubber hydrochloride-vinyl chloride composition also may be vulcanized with sulfur and accelerator to give a vulcanized rubber hydrochloride-vinyl chloride product.

The proportions of rubber hydrochloride to vinyl chloride may be varied from very small amounts of rubber hydrochloride with the vinyl chloride, to very small amounts of vinyl chloride with the rubber hydrochloride. Two or three per cent of rubber hydrochloride will definitely toughen and plasticize polymerized vinyl chloride.

The following example will illustrate our invention as applied to the production of dielectric plates:

Example I

| | Y-2 | DP-649 |
|---|---|---|
| | Parts by weight | Parts by weight |
| Rubber hydrochloride X | 100 | |
| Rubber hydrochloride R or V | | 100 |
| Magnesium oxide | 30 | 30 |
| Hexamethylene tetramine | 2 | 2 |
| Koroseal | 25 | 25 |

Rubber hydrochloride X is an amorphous rubber hydrochloride of lower flow point and greater solubility than rubber hydrochloride R or V. It is obtainable by reacting sheet rubber with liquefied hydrogen chloride at $-85°$ C.

Rubber hydrochloride V is a crystalline, saturated rubber hydrochloride made by reacting sheet rubber with gaseous hydrogen chloride under superatmospheric pressure at above 90° C.

Rubber hydrochloride R is also a crystalline saturated rubber hydrochloride, and is made in the same way as rubber hydrochloride V except that the temperature of reaction is below 90° C. and above $-35°$ C.

Koroseal is the trade name for a polymerized vinyl chloride composition of B. F. Goodrich Company. It is made as described in Semon Patent No. 1,929,453. A preferred composition for use with rubber hydrochloride contains eight parts of insoluble highly polymerized vinyl chloride, three parts of tricresyl phosphate and three parts of dibutyl phthalate.

The ingredients shown in Example I were mixed together on rolls such as are ordinarily used in rubber compounding, then calendered into sheets, the sheets cut to the desired size, and molded into plates at 270° F. for three minutes. These plates gave efficient service as dielectric plates in an ozonator.

Example II

| | Parts by weight |
|---|---|
| Rubber hydrochloride | 50 |
| Magnesium oxide | 5 |
| Polyvinyl chloride | 100 |

The magnesium oxide was added to the polyvinyl chloride on the mill roll immediately followed by the rubber hydrochloride. A homogenous composition was attained which could be readily calendered into thin sheets of .004" thickness. Such sheets were made into tape and used to insulate wire conductors.

*Example III*

|  | DP21 | DP22 | DP37 | DP38 |
| --- | --- | --- | --- | --- |
|  | Parts by weight | Parts by weight | Parts by weight | Parts by weight |
| Rubber hydrochloride | 100 | 100 | 100 | 100 |
| Magnesium oxide | 3 | 3 | 3 | 3 |
| Amyl amine | 4 | 4 | 4 | 4 |
| Dibutyl phthalate |  |  | 10 | 10 |
| Vinyloid A | 10 | 25 | 10 | 25 |

The magnesium oxide was added to the rubber hydrochloride on the mill roll immediately followed by the vinyloid A. The composition was intimately mixed and then sheeted and molded into plates.

*Example IV*

|  | DP1619 | DP1620 |
| --- | --- | --- |
|  | Parts by weight | Parts by weight |
| Rubber hydrochloride | 100 | 100 |
| Magnesium oxide | 10 | 10 |
| Hexamethylenetetramine | 2 | 2 |
| Vinylite 0110 | 25 | 100 |

The ingredients were intimately admixed by milling and the milled composition then molded five minutes at 268° F. Tough strong products, highly resistant to water, kerosene, lubricating oils, were obtained. Electrical properties were also good. The rubber hydrochloride-vinyl composition was more water resistant than the rubber hydrochloride and tougher and more oil resistant than the vinylite.

*Example V*

| | Parts by weight |
| --- | --- |
| Rubber hydrochloride (29% chlorine) (amorphous product) | 5 |
| Magnesium oxide | 1 |
| Polyvinyl chloride (benzol soluble type) | 10 |
| Soft chlorinated diphenyl | 2 |
| Benzol | 100 |

The ingredients were mixed together by stirring and the resulting solution of rubber hydrochloride and vinyl chloride containing dispersed magnesium oxide was coated over insulated ignition wire to form a protective covering resistant to ozone, flameproof, water resistant, and of high electrical resistance. Products of higher flow point and of superior resistance to hydrocarbons such as gasoline, kerosene, and benzol, are made by using highly polymerized vinyl chloride in place of the more soluble type, and a rubber hydrochloride V or R in place of the amorphous rubber hydrochloride. This composition is dispersed in a hot chlorinated hydrocarbon such as chlorobenzene instead of benzol.

We claim:

1. An electrical insulation comprising polymerized vinyl chloride and rubber hydrochloride intimately admixed to form a homogeneous composition, in conjunction with a mutual plasticizer for the rubber hydrochloride and polymerized vinyl chloride.

2. An electrical insulation comprising polymerized vinyl chloride, rubber hydrochloride and tricresyl phosphate intimately admixed to form a homogeneous composition.

3. An electrical insulation comprising polymerized vinyl chloride, rubber hydrochloride and dibutyl phthalate intimately admixed to form a homogeneous composition.

ROY W. IDE, JR.
HERBERT A. WINKELMANN.